2,956,892

GLASS COMPOSITION

James E. Duncan, Brackenridge, Pa., assignor to Pittsburgh Plate Glass Company, a corporation of Pennsylvania No Drawing. Filed Oct. 25, 1957, Ser. No. 692,267

7 Claims. (Cl. 106—52)

The present invention relates to a family of glass compositions suitable to provide a series of opaque glasses having permanent colors ranging from blue to gray. These glass compositions provide a set of colors that are pleasing to the eye and enhance the beauty of a structure whose walls are covered with a glass of this type.

Opaque glasses have found widespread adoption as a structural medium, particularly in the construction of storefronts, kitchens, bathrooms and the like. Production of these glasses by a pot casting method in a range of colors has been very well standardized. The glasses are annealed according to conventional practices and are polished on at least one surface in accordance with conventional, polished, plate glass practices. These manufacturing practices are set forth in the Glass Manual published by Pittsburgh Plate Glass Company, copyrighted 1946. The following U.S. patents describe some of these glasses: 1,956,176 (cream), 2,224,469 (opal base), 2,237,042 (red or pink), 2,282,601 (ivory), 2,394,-502 (white), 2,599,349 (green), 2,683,666 (ivory), and 2,776,900 (tan).

In accordance with this invention it has been found that a pleasing blue to gray color can be imparted to opaque glasses for structural decorative purposes by incorporating fluorine as a fluoride and minor proportions of nickel oxide, chromium oxide, and cobalt oxide in a basic glass. The basic glasses which may be opacified and colored contain 55 to 75% by weight $SiO_2$, 5 to 15% by weight $Na_2O$, 0 to 10% by weight $K_2O$, the total alkali metal oxide content of the glass being not less than 11% nor more than 21% by weight, 2 to 12% by weight $Al_2O_3$, 0 to 10% by weight CaO, 0 to 5% PbO and 0 to 2% by weight $Sb_2O_5$, $As_2O_5$, or combinations thereof.

To the basic ingredients listed above, it is necessary to add the following ingredients within the following percentages by weight in order to obtain the proper opacity and color desired for the finished product. These additives consist of 0.05 to 0.5% NiO, 0.05 to 0.5% $Cr_2O_3$, 0.001 to 0.1% CoO, and 1 to 6% F.

Calculated compositions of typical examples of glasses within the purview of the invention are set forth in the table below. These glasses can be made from conventional glass making batch materials according to conventional procedures as further described below.

Table I

| Ingredient | 1 | 2 | 3 | 4 |
|---|---|---|---|---|
| $SiO_2$ | 67.3 | 67.4 | 66.4 | 70.3 |
| $Na_2O$ | 10.0 | 10.3 | 13.0 | 14.6 |
| $K_2O$ | 4.4 | 4.4 | 1.6 | 2.2 |
| $Al_2O_3$ | 7.6 | 7.5 | 7.5 | 9.8 |
| CaO | 5.4 | 5.1 | 6.1 | .6 |
| PbO | 2.6 | 2.6 | 2.6 | |
| $Sb_2O_5$ | .7 | .7 | .6 | |
| $As_2O_5$ | | | | .6 |
| $F_2$ | 2.9 | 2.7 | 3.3 | 2.7 |
| NiO | .21 | .19 | .08 | .08 |
| $Cr_2O_3$ | .14 | .20 | .08 | .24 |
| CoO | .005 | .03 | .02 | .03 |
| | 101.2 | 101.1 | 101.3 | 101.1 |
| Less oxygen correction | 1.2 | 1.1 | 1.3 | 1.1 |
| Color | Blue-gray | Blue-gray | Blue | Gray |

The oxygen equivalent of fluorine is set forth in the table because of the manner of calculating the composition of the glass. The fluorine shown in the composition in the tables is understood to be present in the glasses in some combined form but not as a gas. It is not known exactly how the fluorine is combined, but it is probably combined as a fluoride such as NaF, KF, or $CaF_2$.

In an analysis of a glass, it is customary to analyze only for the elements and then list the presence of these elements in the glass as oxides. In cases where some fluorine is present in the glass, it is probably present as a fluoride compound with a cation in the glass and thus replaces a stoichiometric equivalent of oxygen with this cation. Thus, it is convenient to show the amount of fluorine in percent by weight as fluorine and then subtract from the sum total percentages of the glass composition based on oxides, its stoichiometric equivalent of oxide in percent by weight.

Silica is the principal glass former. A range of $SiO_2$ of between 55 and 75 percent by weight is preferred. The durability of a glass containing less than 55 percent by weight $SiO_2$ is poor and it is difficult to melt a glass containing over 75 percent by weight $SiO_2$. There is also a tendency for glasses containing more than the desired maximum of $SiO_2$ to devitrify.

The alkali metal oxides, $Na_2O$ and $K_2O$ are the principal fluxes. $Li_2O$ may also be used to replace part of the $Na_2O$ and $K_2O$, however, this material increases the cost of the batch. It is preferred to have between 11 and 21 percent by weight of the total alkali metal oxides in the glasses of the invention. Glasses having below 11 percent by weight alkali metal oxide are difficult to melt. The glasses have poor durability when the total alkali metal oxide content exceeds 21 percent by weight.

The alumina increases the working range of the glasses. If more than 12 percent by weight of $Al_2O_3$ is included in the glasses, an excessive amount of alkali metal oxide and fluorine is required to compensate for the stiffness imparted to the glass by the alumina. The glasses have too narrow a working range if less than 2 percent by weight $Al_2O_3$ is employed.

Up to 10 percent by weight of CaO may be included in the glasses. CaO tends to produce smaller fluoride crystals. For glasses wherein an opacity with smaller fluoride crystals is desired, a high percentage of calcium oxide is required. Glasses containing above 10 percent by weight CaO required an extremely high percentage of fluorine. When the maximum opacity with the minimum amount of fluorine is desired, the glasses should be substantially free from CaO.

The presence of PbO in the glasses is desirable when a substantial amount of CaO is present. While the PbO is not essential, the combination of the CaO and PbO results in improved color and uniformity in the formed glass. In glasses containing a low percentage of CaO where the opacity is relatively dense, the PbO is not essential.

Other bivalent metal oxides such as MgO, ZnO, and BaO may also be substituted for part of the CaO but it has been found that the increased cost of these materials does not justify their use. When such substituted bivalent metal oxides are used, the maximum total weight of the bivalent metal oxides in the glasses may be increased to about 12 percent by weight of the glass.

Arsenic and antimony oxides may be used as refining agents to aid in removing undissolved gases in the molten glass. These refining agents may be used singly or in combination. More than a total of 2 percent by weight of refining agents does not appear to be beneficial to the finished glass.

Fluorine is used as an opacifying agent. It also acts as a flux and a colorant. The amount of white or opacity has a very great effect on the intensity of the color. It is preferred to have between 2.5 and 3.5 percent F in the glasses, although as high as 6 percent or as low as 1 percent by weight may be used depending upon the percentages of the other constituents, the degree of annealing, and the intensity of the color required. If too much fluorine is included, the glasses will opacify too rapidly, thereby forming dense, opaque glasses having a lighter color than that desired. If too little fluorine is employed in combination with the other colorants, colored glasses having a milky or translucent appearance are produced instead of glasses having the desired opacity.

The desired blue to gray color produced results from the mixture of the colors imparted to the glass by the nickel oxide, chromium oxide and cobalt oxide and the white color produced upon crystallization of the fluorine-containing compounds. It is necessary that fluorine and all three colorants be present in the glasses in order to impart a blue to gray color thereto. The glasses should contain 0.05 to 0.5 percent by weight NiO, 0.05 to 0.5 percent by weight $Cr_2O_3$ and 0.001 to 0.1 percent CoO. Glasses within the purview of the invention having a gray color tend to have more $Cr_2O_3$ and NiO in them than those tending to have a blue color. The balance between the fluorine and the coloring agents is necessitated by the manner in which the glasses are formed.

The glasses of the invention may be produced from conventional glass making materials properly compounded and thoroughly mixed so as to yield, when reacted, glasses of the desired ultimate composition. Suitable batch materials include sand, soda ash, potassium carbonate, sodium nitrate, nepheline syenite, feldspar, arsenious oxide, antimony oxide, sodium silico fluoride, fluorspar, lead oxide, barium carbonate, magnesium oxide, nickel oxide, potassium dichromate and cobalt oxide.

Various size pots or crucibles may be employed and the melting temperatures and times will vary according to the amount being formed. Conditions herein recited may be employed to make eight pounds of glass in a refractory pot in a furnace heated by the controlled combustion of natural gas.

An empty pot is preheated in the furnace at a furnace temperature of about 2200° F. A portion of the mixed batch is ladled into the preheated pot and the furnace temperature is gradually increased until it reaches approximately 2500° F. in one hour at which time a second charge of the remaining batch is added to the pot. The pot and its contents are heated for an additional hour and a half and the furnace temperature is gradually increased to 2650° F. At the end of this time, the glass is formed in a molten condition. The molten glass is then held at a furnace temperature of 2650° F. for one hour to permit the conclusion of the chemical reactions, the exclusion of gases and the substantial homogenization of the glass. It is desired that the glass be produced under neutral to slightly oxidizing conditions in the melting furnace or container.

The refined glass is cooled to approximately 2200° F. and the pot is removed from the furnace. The contents of the pot are poured on a cast iron table where the glass is rolled in the form of a plate. The plate is placed in a kiln and cooled from a temperature of about 1050° F. to 850° F. at a rate of about 4° F. per minute. During this cooling operation, the glass is annealed, the fluoride crystals are formed and the color develops as a result of using a combination of the proper proportions of fluorine and the other colorants. After cooling, the glass may be ground and polished.

The glasses set forth above have colors which may be described as having certain radiant energy reflectance values over the visible portion of the spectrum. The glasses of the present invention have radiant energy reflectance values of from 20 to 40 percent at 400 millimicrons, 5 to 25 percent at 450 millimicrons, 5 to 25 percent at 500 millimicrons, 5 to 25 percent at 550 millimicrons, 2 to 22 percent at 600 millimicrons, and 5 to 25 percent at 700 millimicrons.

The reflectance values of the glasses listed in columns 3 and 4 of Table I are set forth below to illustrate specific glasses having reflectance properties within the specified ranges. These reflectance values are relative to pure magnesium oxide.

| Wavelength | 3 | 4 |
|---|---|---|
| 400 | 24.9 | 31.2 |
| 420 | 11.6 | 23.9 |
| 440 | 7.5 | 19.1 |
| 460 | 6.6 | 18.4 |
| 480 | 6.5 | 19.0 |
| 500 | 6.4 | 20.0 |
| 520 | 5.8 | 20.1 |
| 540 | 5.4 | 19.8 |
| 560 | 5.7 | 20.7 |
| 580 | 4.5 | 17.5 |
| 600 | 3.7 | 14.5 |
| 620 | 3.3 | 13.2 |
| 640 | 3.2 | 12.5 |
| 660 | 3.5 | 13.7 |
| 680 | 5.4 | 18.1 |
| 700 | 9.0 | 24.3 |

Although the present invention has been described with respect to specific details of certain embodiments thereof, it is not intended that such details be limitations upon the scope of the invention except insofar as set forth in the following claims:

This application is a continuation-in-part of my copending application Serial No. 605,961, filed August 24, 1956, now abandoned, which is a continuation-in-part of my application Serial No. 399,608, filed December 21, 1953, now abandoned.

I claim:

1. A blue to gray colored, opaque glass consisting essentially of the following ingredients in percent by weight: 55 to 75% $SiO_2$, 5 to 15% $Na_2O$, 0 to 10% $K_2O$, the sum total of alkali metal oxides being between 11 and 21%, 2 to 12% $Al_2O_3$, up to 2% of at least one of the group consisting of $Sb_2O_5$ and $As_2O_5$, 0.05 to 0.5% NiO, 0.05 to 0.5% $Cr_2O_3$, 0.001 to 0.1% CoO and 1 to 6% $F_2$.

2. A blue to gray colored, opaque glass consisting essentially of the following ingredients in percent by weight: 55 to 75% $SiO_2$, 5 to 15% $Na_2O$, 0 to 10% $K_2O$, the sum total of alkali metal oxides being between 11 to 21%, 2 to 12% $Al_2O_3$, up to 10% CaO, up to 2% of a refining agent selected from the group consisting of $Sb_2O_5$, $As_2O_5$, and combinations thereof, 0.05 to 0.5% NiO, 0.05 to 0.5% $Cr_2O_3$, 0.001 to 0.1% CoO and 1 to 6% $F_2$.

3. A blue to gray colored, opaque glass consisting essentially of the following ingredients in percent by weight: 55 to 75% $SiO_2$, 5 to 15% $Na_2O$, 0 to 10% $K_2O$, the sum total of alkali metal oxides being between 11 and 21%, 2 to 12% $Al_2O_3$, up to 10% CaO, 0 to 5% PbO, the sum total of bivalent metal oxides being not more than 12%, up to 2% of at least one refining agent selected from the group consisting of $Sb_2O_5$, $As_2O_5$ and combinations thereof, 0.05 to 0.5% NiO, 0.05 to 0.5% $Cr_2O_3$, 0.001 to 0.1% CoO and 1 to 6% $F_2$.

4. A bluish-gray, opaque glass composition having substantially the following composition wherein the ingredients are set forth in percent by weight: 67.3% $SiO_2$, 10.0% $Na_2O$, 4.4% $K_2O$, 7.6% $Al_2O_3$, 5.4% CaO, 2.6% PbO, 0.7% $Sb_2O_5$, 2.9% $F_2$, 0.21% NiO, 0.14% $Cr_2O_3$ and 0.005% CoO, the total exceeding 100% by an amount of oxygen stoichiometrically equivalent to the amount of fluorine present.

5. A bluish-gray, opaque glass having substantially the following ingredients in percent by weight: 67.40% $SiO_2$, 10.3% $Na_2O$, 4.4% $K_2O$, 7.5% $Al_2O_3$, 5.1% CaO, 2.6% PbO, 0.7% $Sb_2O_5$, 2.7% $F_2$, 0.19% NiO, 0.20% $Cr_2O_3$ and 0.03% CoO, the total exceeding 100% by an amount of oxygen stoichiometrically equivalent to the amount of fluorine present.

6. A blue, opaque glass having substantially the following ingredients in percent by weight: 66.4% $SiO_2$, 13.0% $Na_2O$, 1.6% $K_2O$, 7.5% $Al_2O_3$, 6.1% CaO, 2.6% PbO, 0.6% $Sb_2O_5$, 3.3% $F_2$, 0.08% NiO, 0.08% $Cr_2O_3$ and 0.02% CoO, the total exceeding 100% by an amount of oxygen stoichiometrically equivalent to the amount of fluorine present.

7. A gray, opaque glass having substantially the following ingredients in percent by weight: 70.3% $SiO_2$, 14.6% $Na_2O$, 2.2% $K_2O$, 9.8% $Al_2O_3$, 0.6% CaO, 0.6% $As_2O_5$, 2.7% F, 0.08% NiO, 0.24% $Cr_2O_3$ and 0.03% CoO, the total exceeding 100% by an amount of oxygen stoichiometrically equivalent to the amount of fluorine present.

References Cited in the file of this patent

UNITED STATES PATENTS

| | | |
|---|---|---|
| 1,956,176 | Parkinson | Apr. 24, 1934 |
| 2,224,469 | Blau | Dec. 10, 1940 |
| 2,433,882 | Armistead | Jan. 6, 1948 |
| 2,683,666 | Duncan | July 13, 1954 |
| 2,699,399 | Armistead | Jan. 11, 1955 |